(12) United States Patent
Amano

(10) Patent No.: US 12,056,330 B2
(45) Date of Patent: Aug. 6, 2024

(54) INPUT DISPLAY DEVICE

(71) Applicant: Alps Alpine Co., Ltd., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/485,813

(22) Filed: Oct. 12, 2023

(65) Prior Publication Data

US 2024/0126408 A1 Apr. 18, 2024

(30) Foreign Application Priority Data

Oct. 14, 2022 (JP) ................................ 2022-165189

(51) Int. Cl.
| | |
|---|---|
| *G06F 3/04817* | (2022.01) |
| *G06F 3/0362* | (2013.01) |
| *G06F 3/039* | (2013.01) |
| *G06F 3/041* | (2006.01) |
| *G06F 3/044* | (2006.01) |

(52) U.S. Cl.
CPC ........ *G06F 3/04817* (2013.01); *G06F 3/0362* (2013.01); *G06F 3/0393* (2019.05); *G06F 3/0412* (2013.01); *G06F 3/044* (2013.01)

(58) Field of Classification Search
CPC .. G06F 3/04817; G06F 3/0362; G06F 3/0412; G06F 3/044; G06F 3/0393
See application file for complete search history.

(56) References Cited

U.S. PATENT DOCUMENTS

| | | | |
|---|---|---|---|
| 2008/0238879 A1 | 10/2008 | Jaeger | |
| 2019/0391671 A1* | 12/2019 | Pfau | ....................... G06F 3/0362 |
| 2020/0233521 A1* | 7/2020 | Sasaki | ...................... G06F 3/044 |
| 2021/0048846 A1* | 2/2021 | Hinson | ................. G06F 3/0393 |
| 2022/0253158 A1 | 8/2022 | Gaillard et al. | |
| 2023/0400924 A1 | 12/2023 | Gaillard et al. | |

FOREIGN PATENT DOCUMENTS

| | | |
|---|---|---|
| JP | 2020-190832 A | 11/2020 |
| WO | WO 2022/090091 A1 | 5/2022 |

OTHER PUBLICATIONS

Extended European Search Report from EP Application No. 23202017.2, Feb. 16, 2024, 10 pp.

\* cited by examiner

*Primary Examiner* — Benjamin C Lee
*Assistant Examiner* — Nathan P Brittingham
(74) *Attorney, Agent, or Firm* — Crowell & Moring LLP

(57) ABSTRACT

An input display device includes a display configured to display an image, a capacitive touch panel configured to be attached onto the display and include at least one three-dimensional UI portion on a surface of the touch panel, and a detection unit configured to measure a capacitance of the touch panel and detect an operation on the touch panel based on the measured capacitance. The detection unit detects a rotation of the three-dimensional UI portion from a change in coordinates of a finger touching the three-dimensional UI portion, determines that a rotation detected when a finger distance decreases is valid, and determines that the rotation detected when the finger distance does not decrease is invalid.

6 Claims, 6 Drawing Sheets

FIG. 6

| SUBJECT | CONVENTIONAL ALGORITHM | | | APPLIED ALGORITHM IN PRESENT EMBODIMENT | | |
|---|---|---|---|---|---|---|
| | NUMBER OF ROTATION OPERATIONS | NUMBER OF REVERSE ROTATIONS | REVERSE ROTATION RATE | NUMBER OF ROTATION OPERATIONS | NUMBER OF REVERSE ROTATIONS | REVERSE ROTATION RATE |
| A | 70 | 30 | 43% | 26 | 8 | 31% |
| B | 24 | 7 | 29% | 12 | 1 | 8% |
| C | 10 | 0 | 0% | 14 | 2 | 14% |
| D | 62 | 26 | 42% | 26 | 8 | 31% |
| E | 18 | 4 | 22% | 10 | 0 | 0% |
| AVERAGE | 36.8 | 13.4 | 27% | 17.6 | 3.8 | 17% |

INPUT DISPLAY DEVICE

RELATED APPLICATION

The present application claims priority to Japanese Patent Application No. 2022-165189, filed Oct. 14, 2022, the entirety of which is herein incorporated by reference.

BACKGROUND

1. Field

The present disclosure relates to an input display device having a human-machine interface function, and more particularly, to an input display device including an operation portion having a three-dimensional shape.

2. Description of the Related Art

Disclosed in the prior art is an input display device in which a protrusion is provided on a touch panel disposed to be superposed on a display, and an image such as an operation icon is displayed at a position overlapping the protrusion (for example, JP 2020-190832 A). A user performs an input by performing a touch operation on the protrusion.

SUMMARY

In a display device that allows a capacitive touch operation to be performed, a user interface allows a touch position to be ascertained without looking, by allowing the touch position to be tactilely recognized due to a cover glass having an uneven shape (referred to below as a three-dimensional UI).

FIG. 1A illustrates an operation example of a conventional flat touch panel. A user U visually recognizes an operation icon 12 displayed on a display 10 and performs an input by performing a touch operation on a position of the operation icon 12.

FIG. 1B illustrates an operation example of a touch panel having a three-dimensional UI, and FIG. 1C is a schematic cross-sectional view of the three-dimensional UI. A transparent cover lens 26 having an uneven shape is attached onto a touch panel 24, and a display 20 displays an operation icon 22 at a position overlapping the cover lens 26. The user U performs an input by touching the cover glass 26 with a finger. A highly sensitive electrostatic sensor capable of detecting the capacitance (distance) of a finger, even if a distance from the sensor, is long is used for the touch detection. Thus, it is possible to determine whether or not there is a touch, even on the thick cover lens 26. This makes it possible to reduce touch mistakes (operation mistakes) under a situation in which it is difficult to look at an in-vehicle display during driving.

Among the three-dimensional UIs, there is also a cylindrical knob (handle). The knob is operated in a manner of sliding a side surface of the knob with a finger pad and rotating. In practice, the knob does not rotate. For example, as illustrated in FIG. 2A, an icon 40 representing a function (for example, volume or the like) assigned to the operation of a knob 30 is displayed below the knob 30, and a gauge (scale) 50 indicating the rotation amount of the rotation operation on the knob 30 is displayed around the knob 30.

Similarly to the knob/handle of a mechanical switch, a user grips the cylindrical knob 30 with the finger U, and then slides the finger pad on the side surface of the knob 30 to rotate the finger U, as illustrated in FIG. 2B. When referring to the gauge 50 and further performing the rotation operation, the user brings the finger U back to the original position, and then slides the finger pad on the side surface of the knob 30 again to rotate the finger U, as illustrated in FIG. 2C. The user repeats the rotation operation of FIGS. 2B and 2C until the input rotation amount reaches a target value.

However, in an algorithm that simply detects tracing (sliding) of the side surface of the knob, when the finger U is moved from FIG. 2B to FIG. 2C, if the finger U is sufficiently separated from the side surface of the knob and brought back to the original position, the operation is not detected. However, even if a portion of the finger U brushes against the side surface of the knob, a reverse rotation is detected, which causes an erroneous operation. When the reverse rotation is detected, the rotation operation on the knob is brought back in the reverse direction, regardless of performing the rotation operation on the knob. Since a normal mechanical switch does not rotate unless a certain degree of force is applied, such an erroneous operation is unlikely to occur.

In order to prevent erroneous detection of the reverse rotation of the knob, the user needs to be careful not to brush against the side surface of the knob by sufficiently separating the finger from the side surface of the knob each time the operation of FIG. 2C is performed. Thus, operability of the knob is reduced. In view of such circumstances, it is desirable to prevent detection of an unintended rotation such as brushing against the side surface of the knob by the finger tip.

The present disclosure has been made to solve such a conventional problem. An object of the present disclosure is to provide an input display device capable of preventing detection of an unintended rotation of a three-dimensional operation portion.

According to the present disclosure, an input display device includes a display configured to display an image, a capacitive touch panel configured to be attached onto the display and include at least one three-dimensional operation portion on a surface of the touch panel, and a detection unit configured to measure a capacitance of the touch panel and detect an operation on the touch panel based on the measured capacitance, wherein the detection unit detects rotation of the operation portion from a change in a coordinate position of a finger touching the operation portion, determines that a rotation detected when a distance between the finger and the touch panel decreases is valid, and determines that a rotation detected when the distance does not decrease is invalid.

In one aspect, the detection unit determines that a rotation detected when the measured capacitance increases is valid, and determines that a rotation detected when the measured capacitance does not increase is invalid. In one aspect, the detection unit compares the capacitance before detection of a rotation of the operation portion with a capacitance after the detection of the rotation, determines that the detected rotation is valid when a difference in the capacitance is equal to or greater than a threshold value, and determines that the detected rotation is invalid when the difference is not equal to or greater than the threshold value. In one aspect, the input display device further includes a display unit configured to display a gauge representing a detected rotation amount, around the operation portion of the display. In one aspect, the display unit displays an icon representing an input operation at a corresponding position of the operation portion of the display. In one aspect, the operation portion has a shape of a cylindrical knob or handle.

According to the present disclosure, the rotation detected when the distance between the finger and the touch panel decreases is determined to be valid, and the rotation detected when the distance does not decrease is determined to be invalid. Therefore, it is possible to prevent erroneous detection due to an unintended rotation operation of a user.

BRIEF DESCRIPTION OF THE DRAWINGS

FIG. 6 is a table illustrating a detection example of a rotation operation when an algorithm according to the example of the present disclosure is applied, and a detection example of a conventional rotation operation.

DETAILED DESCRIPTION

Next, an embodiment of the disclosure will be described. An input display device according to the present disclosure provides an interface between a person and a machine. The input display device in the present disclosure is not particularly limited, but is applied to, for example, an electronic device equipped with a display with a touch panel. The electronic device equipped with the display with the touch panel is, for example, an in-vehicle device having a navigation function, an audio-visual function, a television function, or the like.

Figure 3:
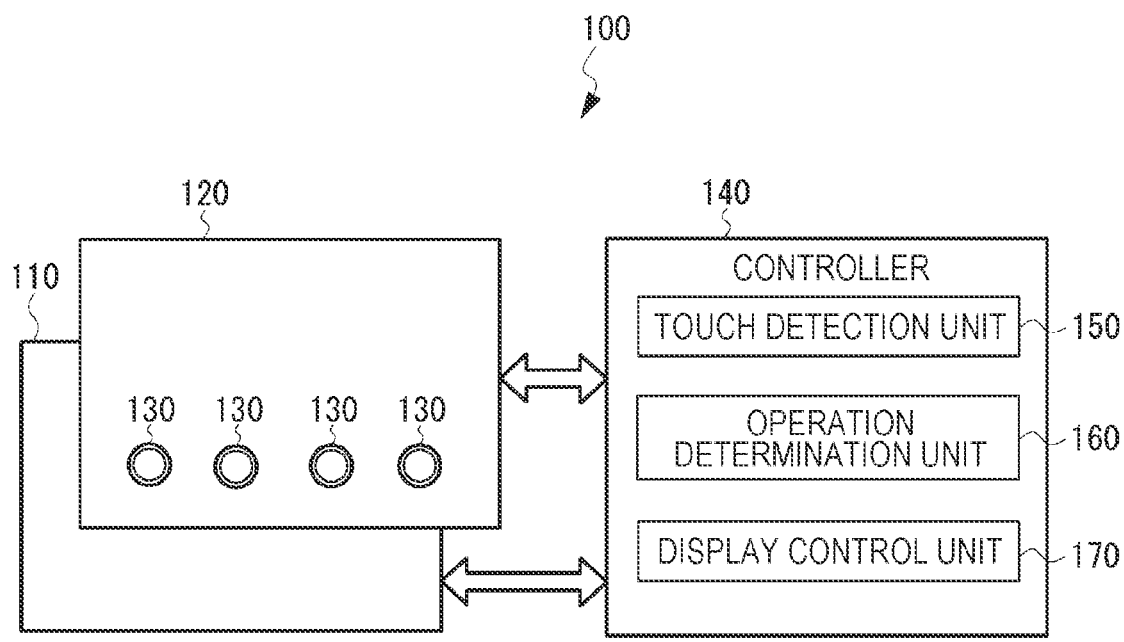
FIG. 3 is a block diagram illustrating a configuration of an input display device according to an example of the present disclosure.

Examples of the present disclosure will be described in detail with reference to the drawings. FIG. 3 is a block diagram illustrating a configuration of an input display device according to an example of the present disclosure. In the present example, an input display device 100 includes a display 110 that displays an image and/or a video, a capacitive touch panel 120 mounted on the display 110, a three-dimensional UI portion (or an operation portion) 130 that has one or a plurality of three-dimensional shapes and is attached to the surface of the touch panel 120, and a controller 140 that controls image display of the display 110, touch detection of the touch panel 110, and the like.

The display 110 is not particularly limited, but includes, for example, a liquid crystal panel or an organic EL panel. The display 110 displays image data provided from the controller 140. For example, an icon representing an input operation of the three-dimensional UI portion 130 is displayed below the three-dimensional UI portion 130.

The touch panel 120 includes, for example, a plurality of detection units (sensors) formed at positions where a plurality of X-side and Y-side electrode lines intersect. The detection unit changes a capacitance when a finger, a hand, or the like of a user approaches or comes into contact with the touch panel 110. The touch panel 120 is mounted on the display 110 and provides an input interface for the user to make an input to an icon or the like displayed on the display 110.

The touch panel 120 further includes one or a plurality of three-dimensional UI portions (operation portions) 130 on the surface of a transparent panel. FIG. 3 illustrates an example in which four three-dimensional UI portions 130 are attached below the touch panel 120, but the number and size of the three-dimensional UI portions 130 are not particularly limited. The three-dimensional UI portion 130 is configured by using a transparent material (for example, acrylic, polycarbonate, glass, and the like) so that an icon displayed on the display 110 can be visually recognized. The bottom surface of the three-dimensional UI portion 130 is bonded to a determined position on the touch panel 120 by using, for example, a double-sided adhesive or the like. Information indicating the attachment position and shape of the three-dimensional UI portion 130 is registered in the controller 140 in advance. For example, when the three-dimensional UI portion 130 has a cylindrical shape, the coordinates of the center, the radius, and the height of the three-dimensional UI portion 130 are registered. When the three-dimensional UI portion 130 has a rectangular shape, the coordinates of an intersection point between the diagonal lines, the coordinates of the corner, the height, and the like are registered.

Figure 1A:
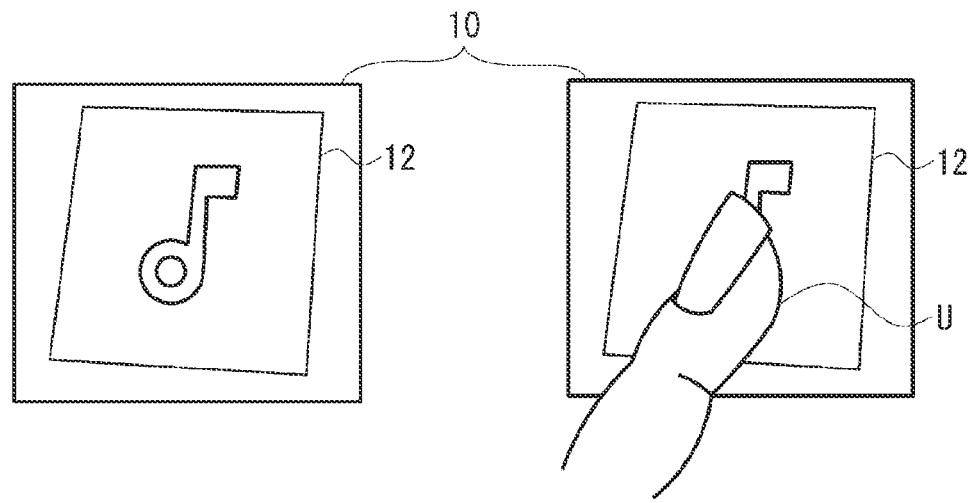
FIG. 1A illustrates an operation example of a flat touch panel.
Figure 1B:
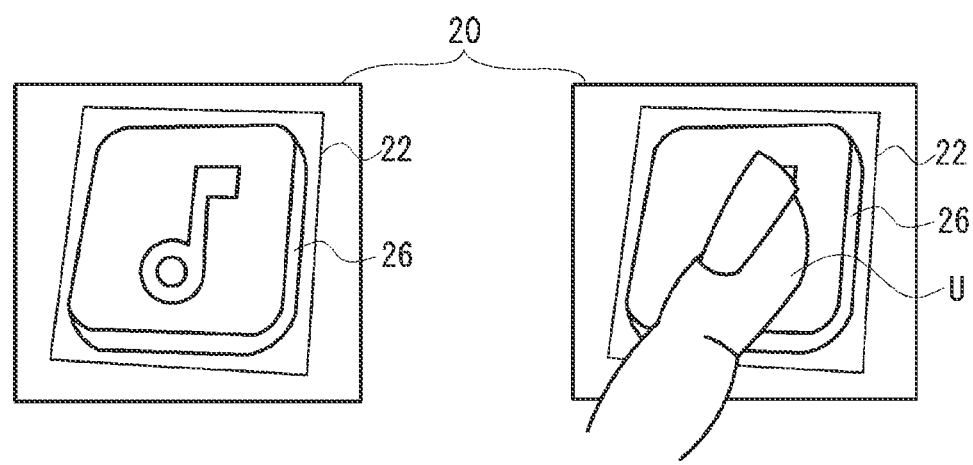
FIG. 1B illustrates an operation example of a touch panel of a three-dimensional UI.
Figure 1C:
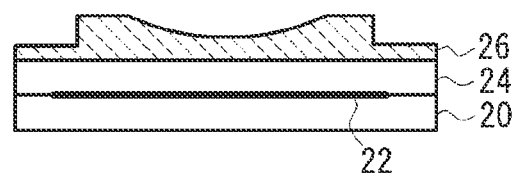
FIG. 1C is a schematic cross-sectional view of the three-dimensional UI.
Figure 2A:
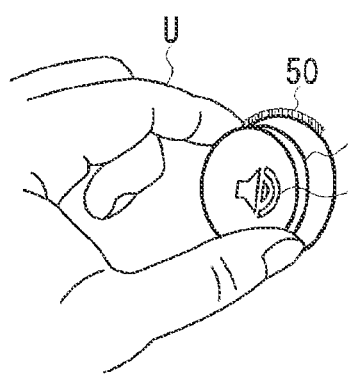
FIGS. 2A to 2C are views for describing a problem of a rotation operation of a knob of a conventional three-dimensional UI.
Figure 2B:
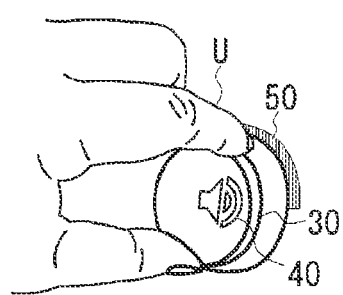
Figure 2C:
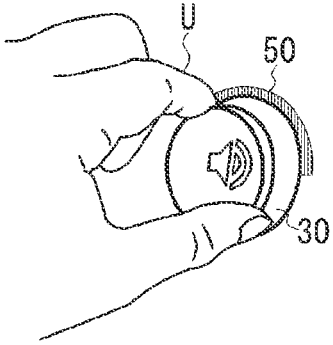

In the present example, the three-dimensional UI portion 130 includes a cylindrical knob or handle, as illustrated in FIGS. 2A to 2C, as a three-dimensional shape that can be rotated by the user (the three-dimensional UI portion may be referred to below as a knob 130). When performing a rotation operation on the knob 130, the user performs an operation of gripping the knob 130 with one or a plurality of fingers, and sliding a side surface of the knob with a finger pad. When such a rotation operation is performed, first, the coordinates of the touch position on the knob 130 are detected, and the rotation angle of the finger is detected from a change in the coordinates of the touch position.

Next, an outline of the disclosure of the input display device 100 in the present example will be described. In the present example, by detecting a change in a capacitance corresponding to a change in a distance (referred to below as a finger distance) from a finger to the detection unit (sensor) of the touch panel at the time of a rotation operation of the knob 130, it is determined whether or not the rotation is intended by the user, and detection of an erroneous operation of a reverse rotation of the knob is prevented.

Figure 4:
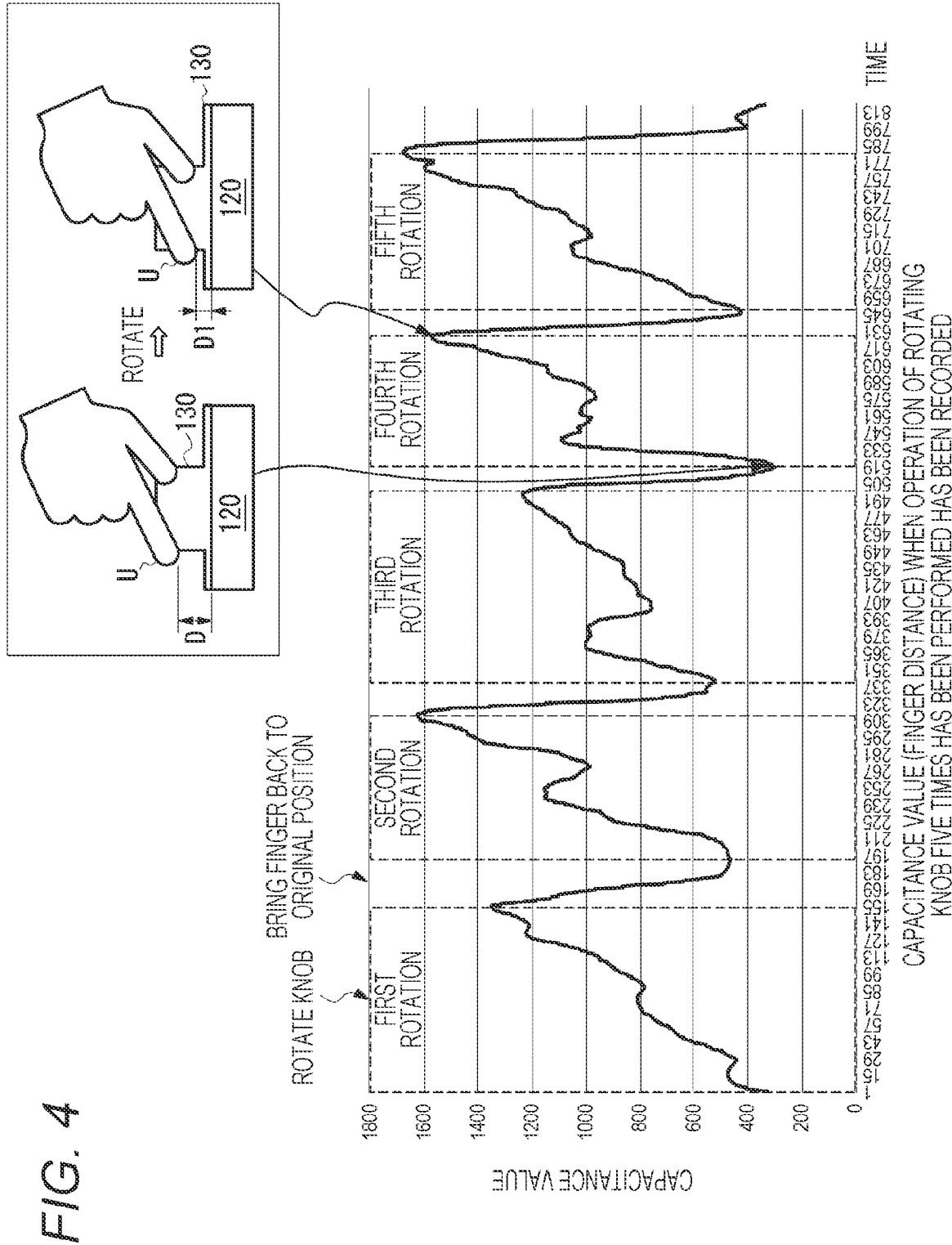
FIG. 4 is a view for describing an overview of the disclosure of an input display device according to the example of the present disclosure.

FIG. 4 is a graph illustrating a finger distance (capacitance value) when the rotation operation of the knob is performed five times. A finger distance D at the start of the rotation operation and a finger distance D1 at the end of the rotation operation are illustrated in the upper portion of FIG. 4. The vertical axis of the graph represents the value of the capacitance, and the horizontal axis represents the time of the rotation operation.

As can be seen from the graph, when the user intentionally rotates the knob 130, a phenomenon occurs in which the finger distance is reduced. That is, the finger distance D at the start of the rotation operation by touching the knob 130 with the finger gradually decreases with the rotation operation, and decreases to the finger distance D1 (D>D1) at the end of the rotation operation. The value of the capacitance of the sensor unit of the touch panel 120 increases as the finger distance decreases. Therefore, as illustrated in the graph, the capacitance value when the rotation of the knob 130 is started is relatively small, and thereafter, the capacitance value increases with the rotation of the knob 130. Such a tendency of the finger distance decreasing is similar to that for both leftward and rightward rotations, and similarly occurs for the right hand and the left hand.

On the other hand, in the operation of returning the finger to the original position (for example, between the first rotation and the second rotation), the capacitance value clearly decreases. Therefore, from the change in the capacitance value at the time of the rotation operation, it is possible to determine whether the rotation operation is a rotation operation intended by the user or an unintended rotation operation of only brushing the finger to return the finger to the original position. It is presumed that such a phenomenon of the finger distance occurs because the user turns the knob while applying some force, and the finger slides toward the sensor.

A detection algorithm of the rotation operation in the present example uses the phenomenon of the finger distance to ignore or invalidate the rotation determination and the rotation detection when the capacitance decreases during the rotation operation, thereby preventing the detection of an unintended reverse rotation, and improving the detection accuracy of the rotation operation.

Next, details of the controller 140 will be described. The controller 140 is electrically connected to the display 110 and the touch panel 120, and performs image control of the display 110 and touch control of the touch panel 120. The controller 140 performs i) overall processing of the input display device, for example, stores data such as a height, a shape, a position, and a video display area of the three-dimensional UI portion 130, ii) a display area correction process, iii) touch detection and operation determination (touch coordinates detection and detection of the magnitude of the finger distance/capacitance) from an output value of the touch panel 120, and iv) a process of video display/video switching according to the touch detection and operation determination. The processing of the controller 140 is performed by hardware and/or software, and is performed by using, for example, a microcontroller including an arithmetic processing unit and a ROM/RAM.

As illustrated in FIG. 3, the controller 140 includes a touch detection unit 150, an operation determination unit 160, and a display control unit 170. The touch detection unit 150 drives the plurality of electrode lines on the X side and/or the Y side of the touch panel 120, measures the capacitance of each detection unit (sensor) of the driven electrode line, and provides the measurement result to the operation determination unit 160.

The operation determination unit 160 detects a touch operation on the touch panel 120 or a rotation operation on the three-dimensional UI portion 130 based on the measurement result of the touch detection unit 150. The touch mentioned here includes not only contact of the finger of the user with the touch panel 120, but also approach of the finger to the touch panel 120 at a predetermined distance. For example, when the finger of the user touches or approaches the flat surface of the touch panel 120, the operation determination unit 160 determines that the touch operation has been made based on the change in the capacitance of the corresponding detection unit. Similarly, when the finger of the user touches or approaches the three-dimensional UI portion 130, the capacitance of the detection unit corresponding to the three-dimensional UI portion 130 changes, and thus it is determined that the touch operation has been made on the three-dimensional UI portion 130 by the change in the capacitance. When a plurality of fingers touch or approach the three-dimensional UI portion 130, a touch operation (touch position) of the plurality of fingers is detected.

In addition, when a finger touch on the knob 130 as illustrated in FIG. 4 is detected, the operation determination unit 160 detects a rotation angle or a rotation amount with respect to the knob based on a change in coordinates of the touch position. When the rotation operation on the knob is detected, the operation determination unit 160 further detects an increase or decrease in the capacitance value, and determines whether or not the rotation operation is intended from the detected increase or decrease. That is, as described with reference to FIG. 4, when the capacitance increases in response to the close finger distance, it is determined that the rotation operation is intended, and when the capacitance decreases, it is determined that the rotation operation is unintended. When the operation determination unit 160 determines the touch operation or the rotation operation, the controller 140 provides the input to another electronic device, or performs display control, or the like, corresponding to the input.

The display control unit 170 displays an image and/or a video on the display 110, and displays an icon at the corresponding position of the three-dimensional UI portion 130. The icon has a design representing an input operation of the user. When the three-dimensional UI portion 130 is a knob, for example, the display control unit 170 displays an icon representing the operation of a volume below the knob, and further displays a gauge (scale) representing the rotation angle or the rotation amount detected by the rotation operation on the knob around the knob. In addition, the display control unit 170 switches an image to be displayed on the display 120 to another image in response to the determination of the operation determination unit 160 that the touch operation or the rotation operation has been made.

Figure 5:
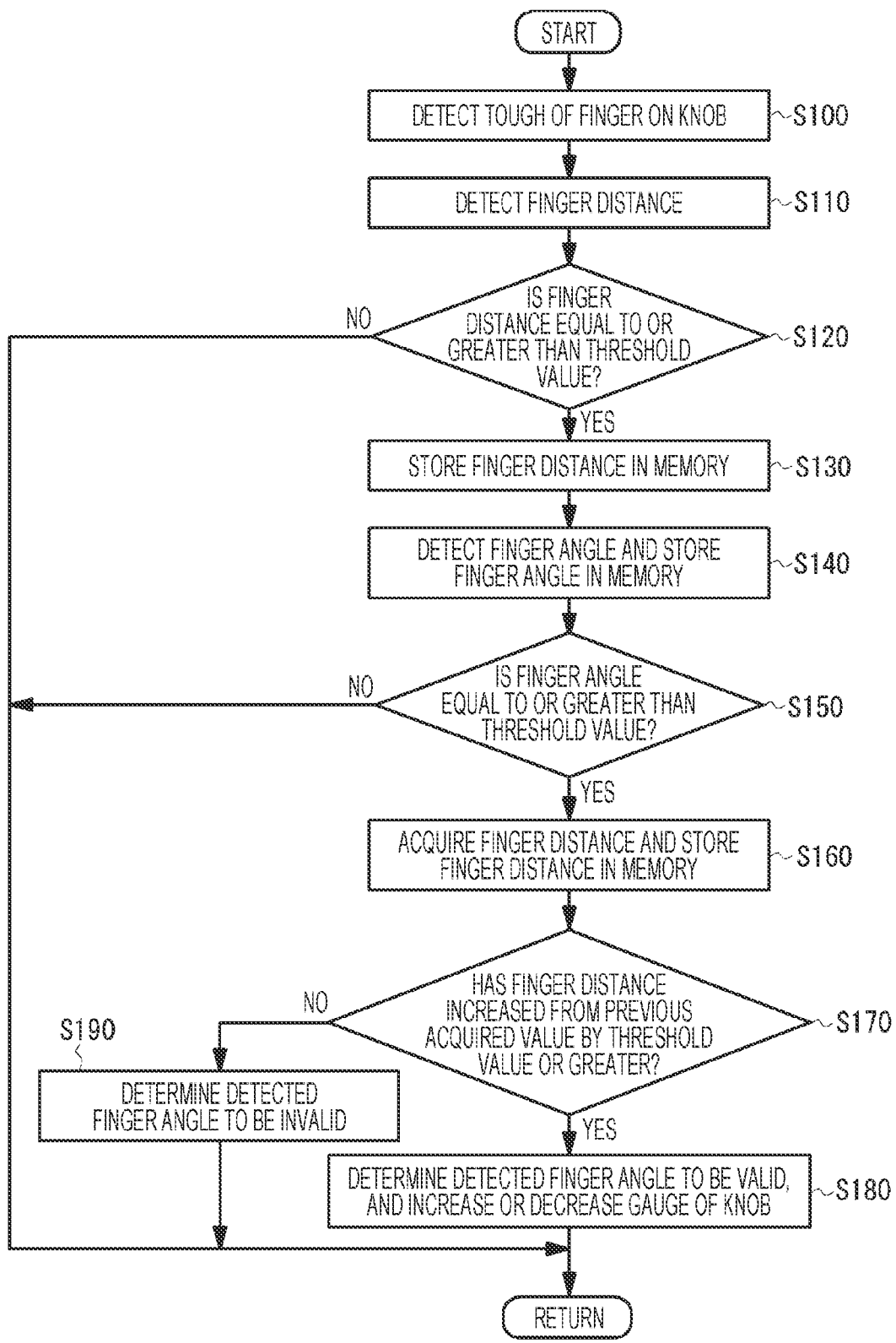
FIG. 5 is a flowchart illustrating an operation of the input display device according to the example of the present disclosure.

Next, an operation example of the input display device in the present example will be described with reference to the flowchart in FIG. 5. The touch detection unit 150 measures the capacitance of the sensor unit of the touch panel 120 at a predetermined measurement cycle (for example, 80 fps (frames/second)), and provides the measurement result to the operation determination unit 160. The operation determination unit 160 detects whether or not the finger has touched the knob 130 from the measurement result (S100). The coordinate position of the knob 130 is registered in advance. The operation determination unit 160 determines that the knob 130 has been touched when the touch position of the finger corresponds to the coordinate position of the knob 130 or the coordinate range thereof. When a plurality of fingers have touched the knob, touch positions of the plurality of fingers are detected. For example, when the touch position of any one of the fingers corresponds to the coordinate position or the coordinate range of the knob, it is determined that the knob has been touched.

Then, the operation determination unit 160 detects a finger distance of the finger touching the knob 130 (S110). In the example of FIG. 4, such detection is the detection of the finger distance D. The detection of the finger distance is detection of the magnitude of the capacitance value. Then, the operation determination unit 160 determines whether or not the finger distance is equal to or greater than a threshold value (S120). The height of the knob 130 is registered in advance. The operation determination unit 160 determines that the finger touches the knob 130 when the finger distance is smaller than the height of the knob 130. When the finger distance is equal to or greater than a threshold value, the operation determination unit 160 stores the detected finger distance in the memory (S130).

When it is determined that the finger has touched the knob, the operation determination unit 160 monitors the capacitance obtained in each measurement cycle of the touch panel 120, detects the rotation angle (referred to below as a finger angle) of the finger with respect to the knob from the change in coordinates indicating the touch position of the finger, and stores the detected finger angle in the memory (S140). The detection of the finger angle is calculated from the coordinate change of the touch position in a period in which the capacitance value increases.

Then, the operation determination unit 160 determines whether or not the finger angle is equal to or greater than a threshold value (S150). That is, it is determined whether a rotation amount of the rotation operation on the knob is equal to or greater than a predetermined value (for example, the rotation amount with respect to the knob is equal to or greater than 15 degrees). When it is determined that the finger angle is equal to or greater than the threshold value, the operation determination unit 160 acquires the finger distance from the capacitance value when the finger angle is detected, and stores the finger distance in the memory (S160). In the example of FIG. 4, this is the detection of the finger distance D1.

Then, the operation determination unit 160 compares the finger distances before and after the detection of the finger angle, and determines whether or not the finger distance has increased from the previously acquired value by the threshold value or greater (S170). That is, the operation determination unit 160 compares the finger distance (the finger distance D in FIG. 4) stored in the memory in Step S130 with the finger distance (the finger distance D1 in FIG. 4) stored in the memory in Step S160 to determine D−D1>threshold value.

When the finger distance is reduced by the threshold value or greater, the operation determination unit 160 determines that the detected finger angle means the rotation operation intended by the user (S180). Therefore, the operation determination unit 160 determines that the detected finger angle means a valid rotation operation, and the display control unit 170 causes the gauge to display the rotation amount according to the finger angle based on the determination result of the operation determination unit 160.

On the other hand, when the finger distance is not reduced by the threshold value or greater, or when the finger distance is increased, the operation determination unit 160 determines that the detected finger angle means a rotation operation not intended by the user (for example, a brushing operation for bringing the finger back to the original position), and determines the detected finger angle to be invalid or ignores the detected finger angle (S190).

FIG. 6 illustrates evaluation results of a detection example of the rotation operation when the algorithm in the present example is applied, and a detection example of the rotation operation by the conventional algorithm. In this evaluation, how many times subjects A to E performed the rotation operation on the knob until the gauge of the volume was maximized (the number of rotation operations), how many times the reverse rotation was performed until the rotation operation was completed (the reverse rotation number), and the occurrence rate of the reverse rotation number (the reverse rotation rate) were measured.

It can be seen that the occurrence of the reverse rotation is greatly reduced when the algorithm in the present example is applied. Accordingly, the rotation operation for smoothly increasing the volume becomes possible, and thus it is possible to reduce the number of rotation operations and improve operability. The reverse rotation rate could be reduced by about 60% from the overall average.

Figure 7A:
FIGS. 7A to 7C are diagrams illustrating another configuration example of a three-dimensional UI portion of the input display device according to the example of the present disclosure.
Figure 7B:
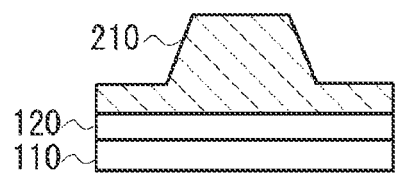
Figure 7C:
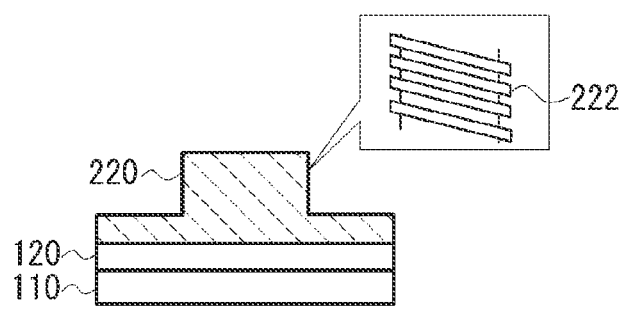

Next, modification examples of the three-dimensional UI portion in the present example will be described. In the above example, the knob used as the three-dimensional UI portion is configured to have a cylindrical shape. However, the present example is not limited to this. By using a trapezoidal knob with which a finger easily slides due to inclination, a phenomenon in which the finger slides to the back during the rotation operation can be clearly observed, and the value of the capacitance can be more smoothly changed (without noise) to enhance the stability of detection of the rotation operation. For example, as illustrated in FIG. 7A, a knob 200 having an inverted truncated cone shape of which the diameter gradually increases upward may be provided. Alternatively, as illustrated in FIG. 7B, a knob 210 having a truncated cone shape of which the diameter gradually decreases upward may be provided. As illustrated in FIG. 4, it was confirmed that the finger distance was close when the user performed the intended rotation operation regardless of the shape of any knob. Further, as illustrated in FIG. 7C, a spiral 222 may be formed on the side portion of a knob 220 so that the finger easily slides to the back during the rotation operation.

In the above example, the cylindrical knob has been exemplified as the three-dimensional UI portion, but this is an example. The shape of the knob or the handle is not particularly limited as long as the phenomenon occurs in which the finger distance is reduced when the rotation operation is performed.

The preferred embodiment of the present disclosure has been described in detail above. However, the present disclosure is not limited to the specific embodiment, and thus various modifications and alterations can be made in the scope of the gist of the invention in the claims.

What is claimed is:

1. An input display device comprising:
a display configured to display an image;
a capacitive touch panel configured to be attached onto the display and include at least one three-dimensional operation portion on a surface of the touch panel; and
a detection unit configured to measure a capacitance of the touch panel and detect an operation on the touch panel based on the measured capacitance,
wherein the detection unit detects rotation of the operation portion from a change in a coordinate position of a finger touching the operation portion, determines that a rotation detected when a distance between the finger and the touch panel decreases is valid, and determines that a rotation detected when the distance does not decrease is invalid.

2. The input display device according to claim 1, wherein the detection unit determines that a rotation detected when the measured capacitance increases is valid, and determines that a rotation detected when the measured capacitance does not increase is invalid.

3. The input display device according to claim 2, wherein the detection unit compares the capacitance before detection of a rotation of the operation portion with a capacitance after the detection of the rotation, determines that the detected rotation is valid when a difference in the capacitance is equal to or greater than a threshold value, and determines that the detected rotation is invalid when the difference is not equal to or greater than the threshold value.

4. The input display device according to claim 1, further comprising: a display unit configured to display a gauge representing a detected rotation amount, around the operation portion of the display.

5. The input display device according to claim 4, wherein the display unit displays an icon representing an input operation at a corresponding position of the operation portion of the display.

6. The input display device according to claim 1, wherein the operation portion has a shape of a cylindrical knob or handle.

* * * * *